US005471013A

United States Patent [19]

Marchetti

[11] Patent Number: 5,471,013

[45] Date of Patent: Nov. 28, 1995

[54] STRAIN RELIEF FOR AN ELECTRICAL APPLIANCE

[75] Inventor: Michael J. Marchetti, Bridgeport, Conn.

[73] Assignee: Black & Decker Inc., Newark, Del.

[21] Appl. No.: 88,299

[22] Filed: Jul. 6, 1993

[51] Int. Cl.$^6$ .......... H02G 3/18

[52] U.S. Cl. .......... 174/65 R; 174/50; 439/457; 439/459

[58] Field of Search .......... 174/65 R, 50; 439/456, 457, 458, 459

[56] References Cited

U.S. PATENT DOCUMENTS

| | | | |
|---|---|---|---|
| 2,536,996 | 1/1951 | Holland et al. | 285/158 X |
| 2,590,886 | 4/1952 | Pederson | 439/463 |
| 3,437,981 | 4/1969 | Keller | 439/463 |
| 3,879,571 | 4/1975 | Reed | 174/65 R |
| 4,162,561 | 7/1979 | Tillemans | 439/459 |
| 4,323,725 | 4/1982 | Miller | 174/65 R |
| 4,591,658 | 5/1986 | Bauer et al. | 174/65 R |
| 4,648,680 | 3/1987 | Gamarra | 439/459 |
| 4,972,044 | 11/1990 | Kropa | 174/65 R |

*Primary Examiner*—Morris H. Nimmo
*Assistant Examiner*—Cheryl R. Figlin
*Attorney, Agent, or Firm*—Barry E. Deutsch

[57] ABSTRACT

A strain relief for an electrical supply cord of an electrical appliance includes a first member pivotally connected to the housing of the appliance. The member includes a generally planar surface. A second member is connected to the housing and has a generally planar surface facing and parallel to the planar surface of the first member. The planar surfaces are spaced from each other to define an electrical supply cord receiving slot. An electrical supply cord is movably disposed in the slot in a direction parallel to the longitudinal axis of the cord. Movement of the cord in either longitudinal direction causes the first member to rotate relative to the second member so that as the planar surface of the first member moves relative to the planar surface of the second member the width of the cord receiving slot is reduced.

4 Claims, 3 Drawing Sheets

STRAIN RELIEF FOR AN ELECTRICAL APPLIANCE

BACKGROUND OF THE INVENTION

This invention relates to a strain relief for an electrical supply cord of an electrical appliance and particularly to a strain relief which operates if the cord is pulled or pushed relative to the appliance housing.

Electrical appliances such as irons, coffeemakers, and the like include electrical supply cords which extend into an opening formed in the housing of the appliance. During normal use of the appliance, the supply cord may be pushed or pulled and in the absence of a suitable strain relief, the stress placed on the supply cord will be transmitted to the electrical connections of the electrical supply cord. If the stress exceeds predetermined limits, the electrical connections can be disrupted.

Various forms of strain relief devices for electrical supply cords are known in the prior art. Some of such devices only provide unitary relief, that is strain relief when the cord is moved relative to the appliance housing in a first direction, e.g. when the cord is pulled. Other strain relief devices provide suitable stress relief when the cord is either pulled or pushed; however, such devices generally tend to be relatively complicated.

Accordingly it is an object of the invention to provide a strain relief for an electrical appliance which relieves stress on the electrical supply cord if the cord is either pulled or pushed.

SUMMARY OF THE INVENTION

The foregoing object of the invention and other objects thereof are attained in a strain relief for an electrical supply cord of an electrical appliance which has a housing and an opening in the housing to admit the supply cord. The strain relief includes a first member pivotally connected to the housing and having a first cord gripping surface. A second member is connected to the housing and has a cord gripping surface facing the cord gripping surface of the first member and is spaced therefrom to define an electrical supply cord receiving slot. An electrical supply cord is movably disposed in the slot in response to pushing or pulling of the cord by the user of the appliance. Movement of the cord in response to pushing or pulling forces causes the first member to rotate relative to the second member so that the width of the slot is reduced to prevent further movement of the cord in response to the push or pull force applied by the user. The stress on the cord is transmitted to the first and second members and is not transmitted to the electrical connections.

DESCRIPTION OF THE PREFERRED EMBODIMENT

Figure 1:
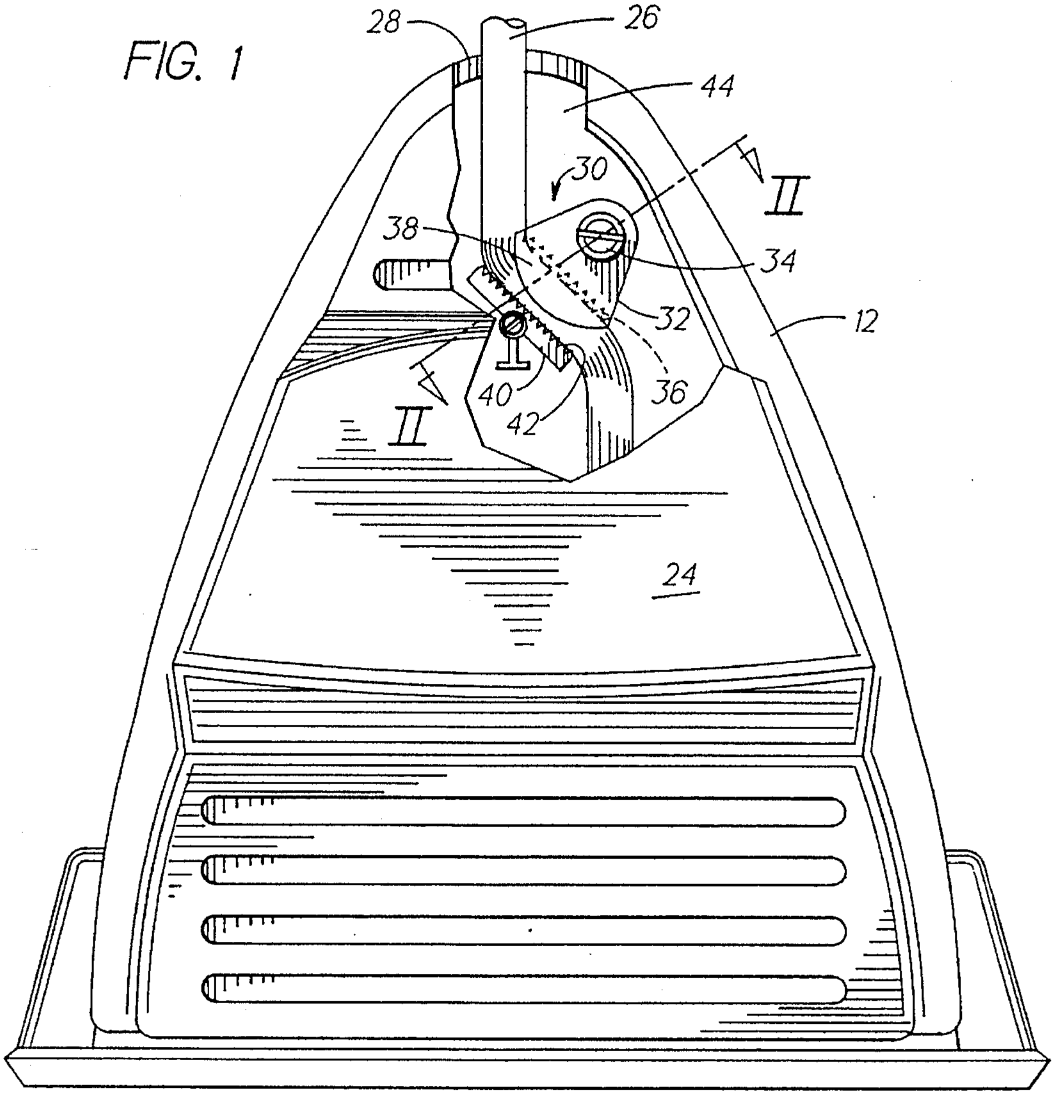
FIG. 1 is an elevational rear view of an iron with a portion of the rear cover broken away to illustrate details of the invention.

Referring now to the various figures of the drawing, there is disclosed a preferred embodiment of the present invention. In referring to the various figures, like numerals shall refer to like parts.

Figure 3:
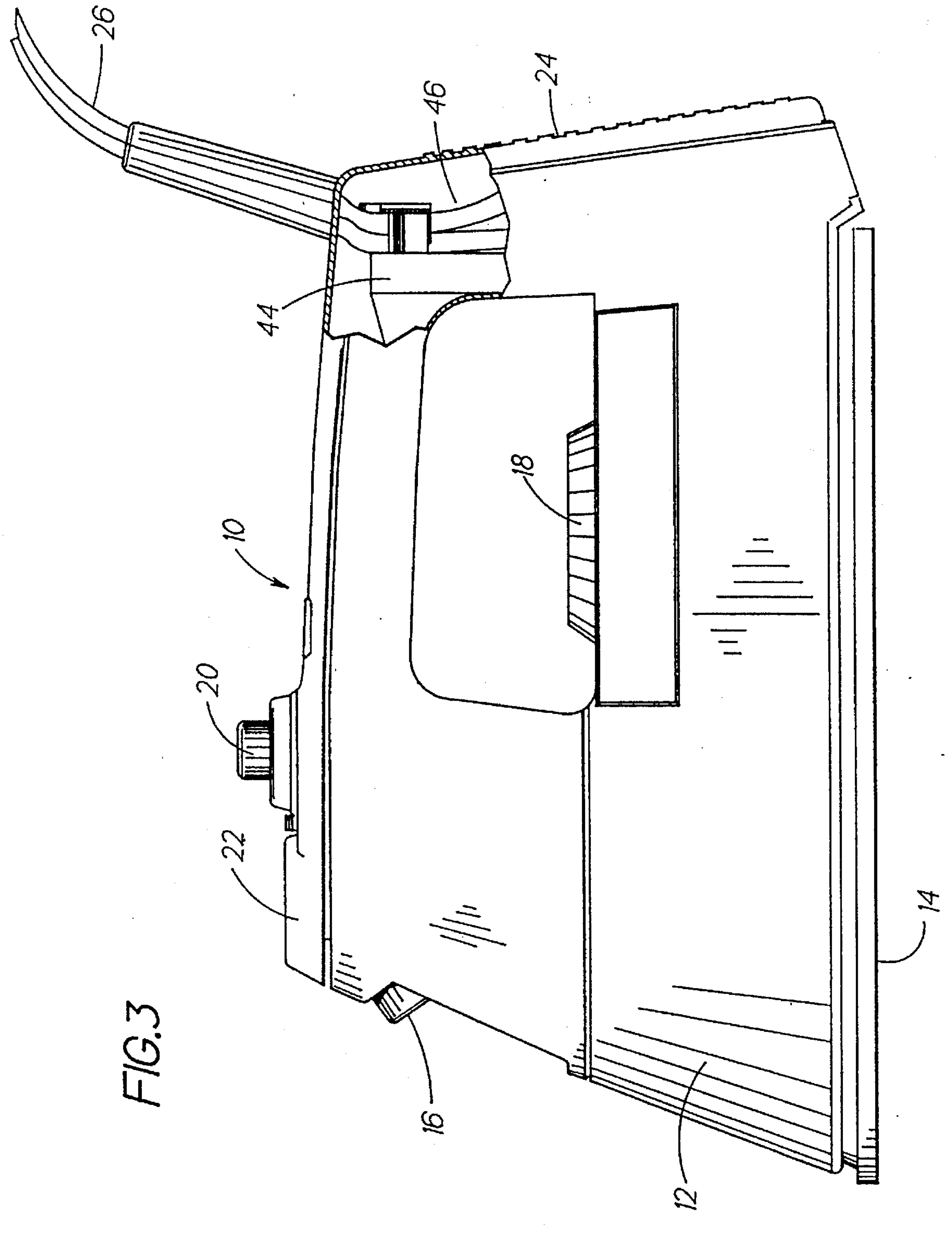
FIG. 3 is a side elevational view of an electrical iron embodying the present invention.

Referring specifically to FIG. 3, there is disclosed an electric iron 10 embodying the present invention. Iron 10 is representative of a standard iron and includes a housing 12 connected to a soleplate 14. A nozzle 16 is mounted at the front or nose of the iron for spraying water onto material being ironed. A control knob 18 is mounted on the saddle of the iron's housing and is connected to the thermostat (not shown) of the iron for adjusting the operating temperature thereof. A control knob 20 is mounted on the upper face 22 of iron housing 12. Control knob 20 is connected to a suitable mechanism (not shown) for controlling the flow of water from the water reservoir of the iron into the steam chamber thereof. The foregoing features are conventional in many present electric irons.

A cover 24 is mounted at the rear of iron 10 and is connected to rear wall 44 of housing 12. An electrical supply cord 26 is connected to a suitable source of electrical power (not shown) for delivering electrical current to the iron for operation thereof. Supply cord 26 is admitted into the rear of housing 12 through an opening 28 formed in upper face 22. Cord 26 is connected to suitable electric terminals enclosed within the rear of housing 12 and cover 24.

Figure 2:
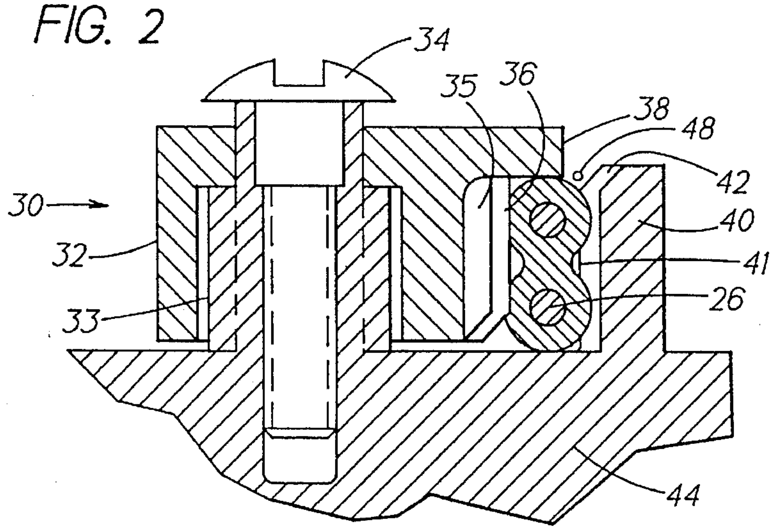
FIG. 2 is an enlarged sectional view taken along Line II—II of FIG. 1.

Referring now to FIGS. 1 and 2, there is shown details of the present invention. Housing 12 includes a rear wall 44 to which cover 24 is connected. Cord 26 extends within space 46 defined between cover 24 and wall 44. When the user employs iron 10 in its intended manner to iron clothes or other material, the motion of the iron causes pushing or pulling forces to be applied to cord 26. If the pushing or pulling forces are excessive, the cord is placed under significant tensile stress which may result in supply cord 26 being disconnected from the terminals within the iron.

To prevent the tensile stress on cord 26 from becoming excessive and potentially causing a disruption of the electrical supply, iron 10 includes strain relief 30. Strain relief 30 includes a first member 32 pivotally attached to boss 33 integrally formed with rear wall 44 of housing 12 by a rivet or screw or other suitable means 34. Means 34 functions as a pivot for member 32. Member 32 includes a generally planar surface 35 having a plurality of teeth 36 formed thereon. Planar surface 35 defines a first cord gripping surface of strain relief 30. Member 32 includes a flange-like surface 38 which functions as a hood for a reason to be described hereinafter.

Figure 4:
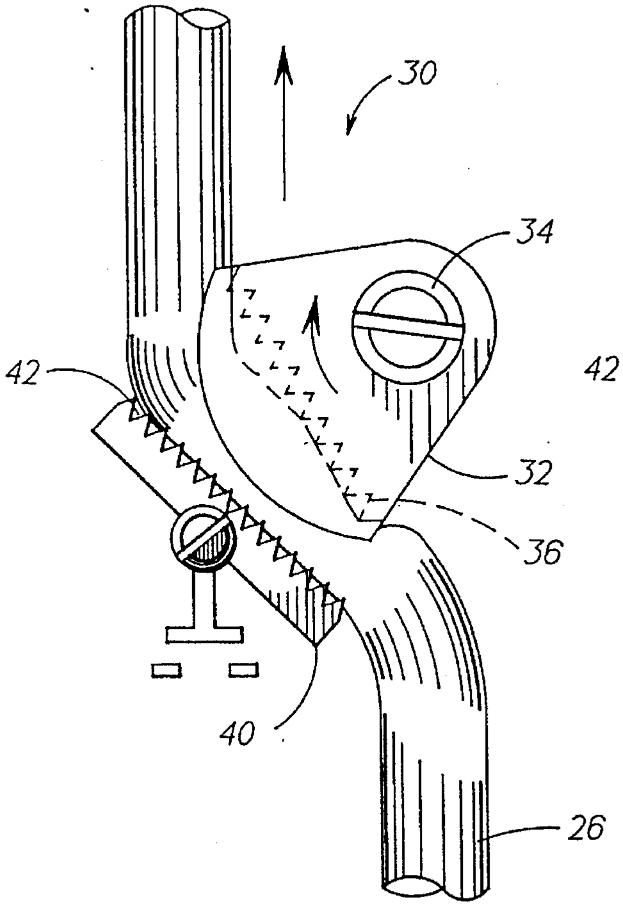
FIG. 4 is an enlarged elevational view of the strain relief of the invention in a first operating position.
Figure 5:
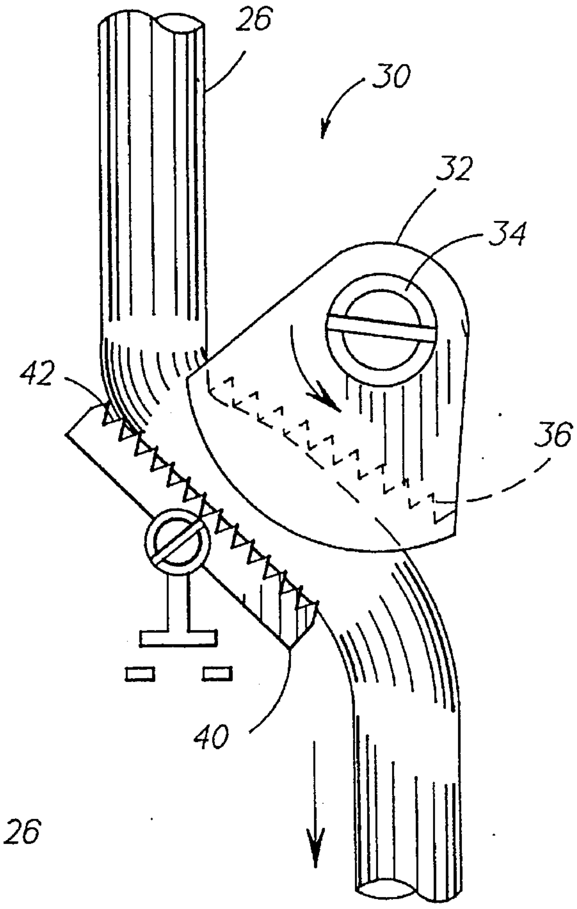
FIG. 5 is a view similar to FIG. 4 showing the invention in a second operating position.

Strain relief 30 includes a second member 40 which, in the preferred embodiment comprises a rib integrally formed with rear wall 44. Member 40 includes a planar surface 41 spaced from planar surface 35 of first member 32. In the absence of any forces on cord 26, the two surfaces 35 and 41 are generally parallel to each other as illustrated in FIG. 1. Spaced surfaces 35 and 41 define therebetween a slot 48 for receiving electrical supply cord 26. Planar surface 41 includes a plurality of teeth 42 for gripping supply cord 26. In the position illustrated in FIG. 1, hereinafter referred to as the "at rest" position, faces 35 and 41 are parallel to each other and the width of slot 48 is at its maximum. With reference to FIGS. 4 and 5, it will be readily observed that member 32 has been rotated relative to member 40 in response to use of the iron. When the user of the iron is applying a pull force on cord 26, the force is transmitted through the cord to rotate member 32 clockwise about its pivot 34. Due to the geometry of the planar surface 35 of member 32 the width of slot 48 is reduced as member 32 rotates in response to the pull force applied to cable 26.

Likewise, when a push force is applied to cord 26, member 32 rotates in a counter-clockwise direction to again reduce the width of slot 48. As the width of slot 48 is reduced by rotation of member 32 in either a counter-clockwise or a clockwise direction from its "at rest" position, the teeth 26 and 42 respectively on planar gripping surfaces 35 and 41 bite into the insulation of cord 26. When the width of slot 48 has been substantially reduced, further movement of cord 26 is prevented. The tensile stress on the cord as a consequence of the push or pull forces is thence transmitted from the cord through the members 32 and 40 to the rear wall 44 of housing. The foregoing prevents the cord from being disconnected from the electrical terminals of iron 10.

Strain relief 30 of the present invention effectively relieves tensile stress on cord 26 in response to push or pull forces applied to the cord. Strain relief 30 is relatively inexpensive to manufacture yet very effective in relieving the strain on cord 26.

Flange-like surface 38 of member 32 overlies slot 48 to prevent cord 26 from being ejected from the slot when the cord is pushed or pulled. Surface 38 insures that strain relief 30 will perform its desired function during operation of iron 10.

While a preferred embodiment of the present invention has been described and illustrated the invention should not be limited thereto but may be otherwise embodied within the scope of the following claims:

What is claimed is:

1. An electrical iron having a housing including means defining an opening, and a rear wall, an electrical power supply cord extending through said opening, and a strain relief for said power supply cord, said strain relief comprising:

a first member pivotably connected to said rear wall of said housing and including a generally planar surface comprising a plurality of spaced teeth;

a second member connected to said rear wall of said housing and having a generally planar surface facing and parallel to the planar surface of the first member and spaced therefrom to define an electrical supply cord receiving slot, the planar surface of the second member including a plurality of spaced teeth, the width of said slot being a maximum when the first and second surfaces are disposed in parallel relation; and an electrical supply cord movably disposed in said slot in a direction parallel to the longitudinal axis of said cord, with movement of the cord in either longitudinal direction causing the first member to rotate relative to the second member to move the first surface relatively closer to the second surface to reduce the width of the slot so that the teeth of the first and second members grip the surface of the insulation of the cord to prevent further movement of the cord in the same longitudinal direction, tensile stress on said cord being transmitted from said first and second members to said rear wall of said housing.

2. An electrical iron in accordance with claim 1 wherein the second member comprises a rib formed integrally with the rear wall of the housing.

3. An electrical iron in accordance with claim 2 wherein said first member includes a flange-like surface overlying said slot for retaining said cord in said slot.

4. An electrical iron in accordance with claim 1 wherein said first member includes a flange-like surface overlying said slot for retaining said cord in said slot.

* * * * *